(12) United States Patent
Hadden

(10) Patent No.: US 7,537,692 B1
(45) Date of Patent: May 26, 2009

(54) SELF-CLEANING AQUARIUM AND ASSOCIATED METHOD

(76) Inventor: Lyle Hadden, P.O. Box 341, Wellington, UT (US) 84542

( * ) Notice: Subject to any disclaimer, the term of this patent is extended or adjusted under 35 U.S.C. 154(b) by 150 days.

(21) Appl. No.: 11/818,747

(22) Filed: Jun. 15, 2007

(51) Int. Cl.
*A01K 63/04* (2006.01)

(52) U.S. Cl. .................... 210/167.23; 210/767; 119/259

(58) Field of Classification Search ............ 210/167.21, 210/167.23, 767, 805; 119/259
See application file for complete search history.

(56) References Cited

U.S. PATENT DOCUMENTS

| | | | | |
|---|---|---|---|---|
| 3,785,342 | A | * | 1/1974 | Rogers ........................ 119/259 |
| 3,886,902 | A | * | 6/1975 | Haynes ........................ 119/224 |
| 4,035,298 | A | * | 7/1977 | Cloke et al. ............. 210/167.24 |
| 4,921,614 | A | * | 5/1990 | Frickman et al. ............ 210/695 |
| 5,190,647 | A | * | 3/1993 | Balestrieri ............. 210/167.26 |
| 5,269,914 | A | * | 12/1993 | Englert ........................ 210/151 |
| 6,761,133 | B1 | * | 7/2004 | Gearhart ...................... 119/269 |

FOREIGN PATENT DOCUMENTS

JP           11-9911 A   *   1/1999

* cited by examiner

*Primary Examiner*—Fred Prince

(57) ABSTRACT

A self-cleaning aquarium includes a container for receiving and housing water includes a wall having a plurality of apertures formed therein. A corrugated base member has juxtaposed crests and troughs and is removably positioned within the container. The troughs are abutted against one wall and linearly aligned with the apertures respectively. The base member is intercalated between a filter screen and a bottom wall of the container respectively and includes walls spanning from the bottom wall of the container to the filter screen. The filter screen is removably positioned directly on the base member and is situated above the apertures. A plurality of valves are operably coupled to the apertures and are in fluid communication with the cavity. Such valves are independently adapted between open and closed positions for channeling bacteria and debris out from the container while filled with water.

18 Claims, 3 Drawing Sheets

SELF-CLEANING AQUARIUM AND ASSOCIATED METHOD

CROSS REFERENCE TO RELATED APPLICATIONS

Not Applicable.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

1. Technical Field

This invention relates to aquariums and, more particularly, to a self cleaning aquarium for automatically removing undesirable debris and bacteria from water housed within the aquarium while aquatic animals remain within the aquarium.

2. Prior Art

The maintenance of high water quality in aquariums is essential for successfully keeping many breeds of fish and other aquatic organisms. For example, it is the dream of every discus fish hobbyist to decorate their living space with plant-containing aquariums in which large discus fish live comfortably. However, it is not only labor-intensive, but also impractical for amateur hobbyists, or even professional breeders, to keep discus fish in tanks with plants due to the fact that discus require ultra clean water. The major source of contamination in an aquarium tank is debris from left-over food, plant and animal waste accumulated under the gravel, with the resulting release of excessive amounts of toxic metabolites and substances such as ammonium and organic acids from decaying substances. In addition, the presence of such debris promotes the growth of infectious bacteria and fungi. It is therefore strongly recommended that aquariums with discus fish do not contain any kind of bottom substrate in order to avoid the accumulation of debris. The only way to make a more attractive discus tank is to decorate the tank with individually potted plants, thereby lowering the aesthetic quality of the aquarium. It would therefore be advantageous to provide a means for assisting a user to remove debris and bacteria from a tank without having to remove all the water from the aquarium.

This prior art example shows a filter system for use with an aquarium that includes a housing for a pre-filter chamber, a biological chamber, and a sump. A protein skimmer receives water flowing from the pre-filter chamber and returns the water to the pre-filter chamber, such that a portion of the water flows through the protein skimmer several times before being returned to the aquarium. The biological chamber has a drip drawer holder having drip drawers for holding filter media pads and dispersing water evenly over biological media in the biological chamber. Unfortunately, this prior art example requires manual operation which is both difficult and time consuming.

Another prior art example shows an apparatus and method for removing foreign matter from water at selected levels in an aquarium that utilizes a valving mechanism placed between a skimmer adjacent the upper surface of the water and a lower inlet adjacent the lower bottom of the aquarium. The valving mechanism is operated selectively to control the relative volume of the flow of water through the skimmer and through the lower inlet, and a corresponding continuous withdrawal of water, together with entrained foreign matter, passes through either one or both the skimmer or the lower inlet so as to remove foreign matter from selected levels in the aquarium. Unfortunately, this prior art example utilizes a valving mechanism that must be manually adjusted in order to function properly.

Accordingly, a need remains for a self-cleaning aquarium in order to overcome the above-noted shortcomings. The present invention satisfies such a need by providing an apparatus that is convenient and easy to use, lightweight yet durable in design, which automatically removes undesirable debris and bacteria from water housed within the aquarium while aquatic animals remain within the aquarium. Such an apparatus assists a user to maintain balanced PH and chlorine levels within an aquarium while saving time, water and electricity.

The present invention is simple to use, inexpensive, and designed for many years of repeated use.

BRIEF SUMMARY OF THE INVENTION

In view of the foregoing background, it is therefore an object of the present invention to provide an apparatus for automatically removing undesirable debris and bacteria from water housed within the aquarium while aquatic animals remain within the aquarium. These and other objects, features, and advantages of the invention are provided by a self-cleaning aquarium.

The apparatus includes a container that has a plurality of monolithically formed walls defining a cavity therebetween for receiving and housing the water. One of the walls has a plurality of apertures formed therein that span along a major longitudinal length thereof. The apparatus further includes a corrugated base member removably housed within the container and seated directly on a bottom one of the walls. Such a base member has a plurality of juxtaposed crests and troughs horizontally offset along a longitudinal length of the bottom wall. The troughs are abutted against the one wall and linearly aligned with the apertures respectively. Such crests and troughs are equidistantly spaced apart such that the valves are centrally aligned with the troughs.

The base member is intercalated between the filter screen and the bottom wall of the container respectively. The base member includes a plurality of coextensively shaped walls diagonally spanning from the bottom wall of the container to the filter screen. Each of the walls have planar faces wherein a first group of the walls are disposed parallel to each other while a second group of the walls are disposed parallel to each other. Selected ones of the first and second group of walls are registered orthogonal to adjacent ones of the second and first group of walls respectively.

The apparatus further includes a filter screen removably positioned directly on the base member. Such a filter screen is situated above the apertures. The filter screen is provided with a plurality of uniformly disposed holes formed therein. Selected rows of the holes are aligned between corresponding pairs of the crests for effectively directing the undesirable debris and bacteria towards corresponding ones of the troughs respectively.

The apparatus further includes a plurality of valves operably coupled to the apertures and is in fluid communication with the cavity for advantageously discharging the undesirable debris and bacteria outwardly from the cavity. Such valves are independently adapted between open and closed positions.

A method for discharging undesirable debris and bacteria from an aquarium while aquatic animals are housed therein includes the steps of providing a container that has a plurality of monolithically formed walls defining a cavity therebetween for the receiving and housing of water. The steps further include forming a plurality of apertures in one of the walls and the apertures span along a major longitudinal length of the one wall.

The steps further include removably housing a corrugated base member within the container by directly seating the base member on a bottom one of the walls. The base member has a plurality of juxtaposed crests and troughs horizontally offset along a longitudinal length of the bottom wall. The steps further include abutting the troughs against the one wall by linearly aligning the troughs with the apertures respectively and removably positioning a filter screen directly on the base member by situating the filter screen above the apertures. The steps further include operably coupling a plurality of valves to the apertures such that the valves are in fluid communication with the cavity for discharging the undesirable debris and bacteria outwardly from the cavity.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

It is noted the purpose of the foregoing abstract is to enable the U.S. Patent and Trademark Office and the public generally, especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

BRIEF DESCRIPTION OF THE SEVERAL VIEWS OF THE DRAWING

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

DETAILED DESCRIPTION OF THE INVENTION

The present invention will now be described more fully hereinafter with reference to the accompanying drawings, in which a preferred embodiment of the invention is shown. This invention may, however, be embodied in many different forms and should not be construed as limited to the embodiment set forth herein. Rather, this embodiment is provided so that this application will be thorough and complete, and will fully convey the true scope of the invention to those skilled in the art. Like numbers refer to like elements throughout the figures.

Figure 1:
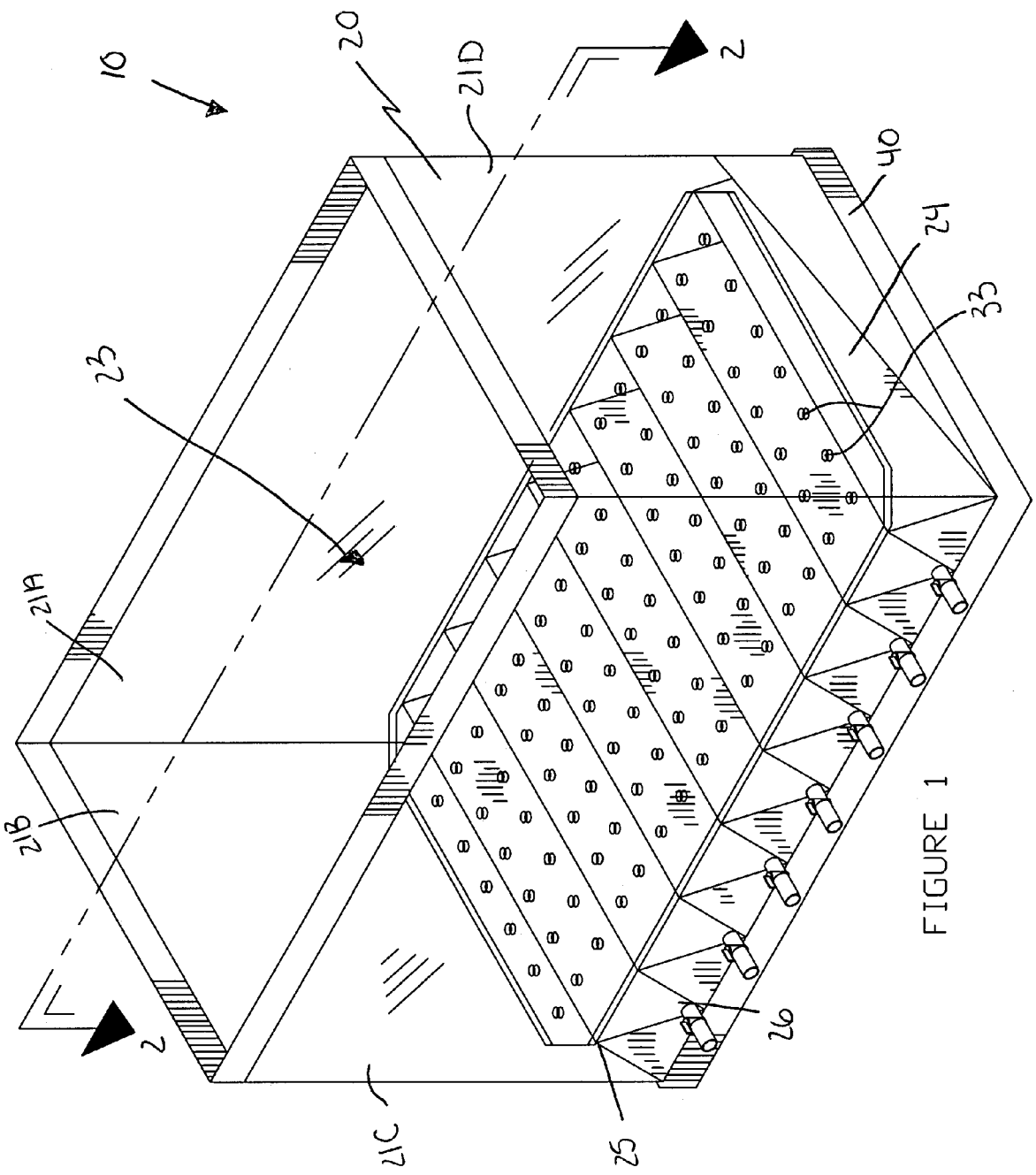
FIG. 1 is a perspective view showing a self-cleaning aquarium, in accordance with the present invention.
Figure 2:
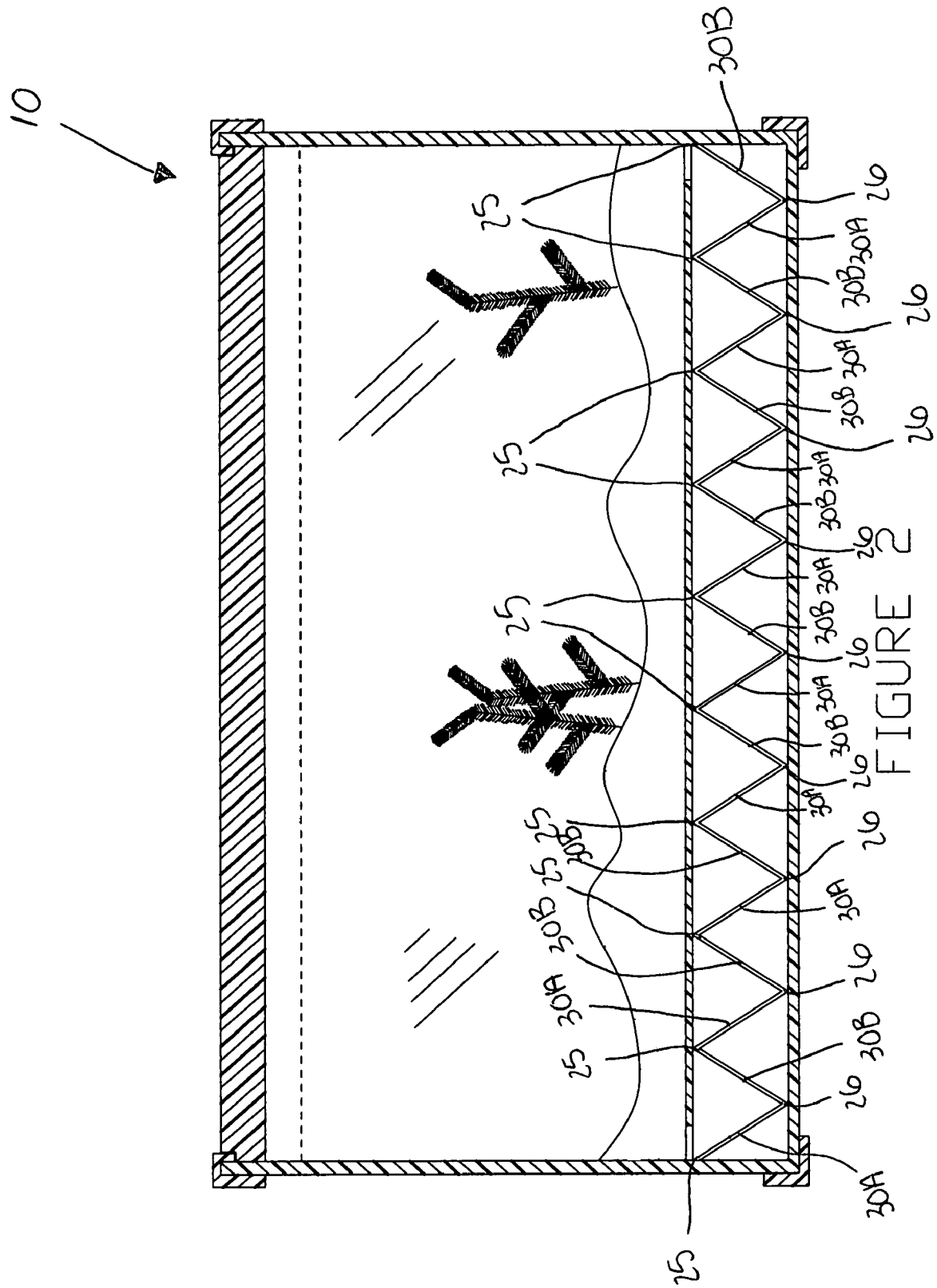
FIG. 2 is a cross sectional view of the self-cleaning aquarium shown in FIG. 1, taken along line 2-2.
Figure 3:
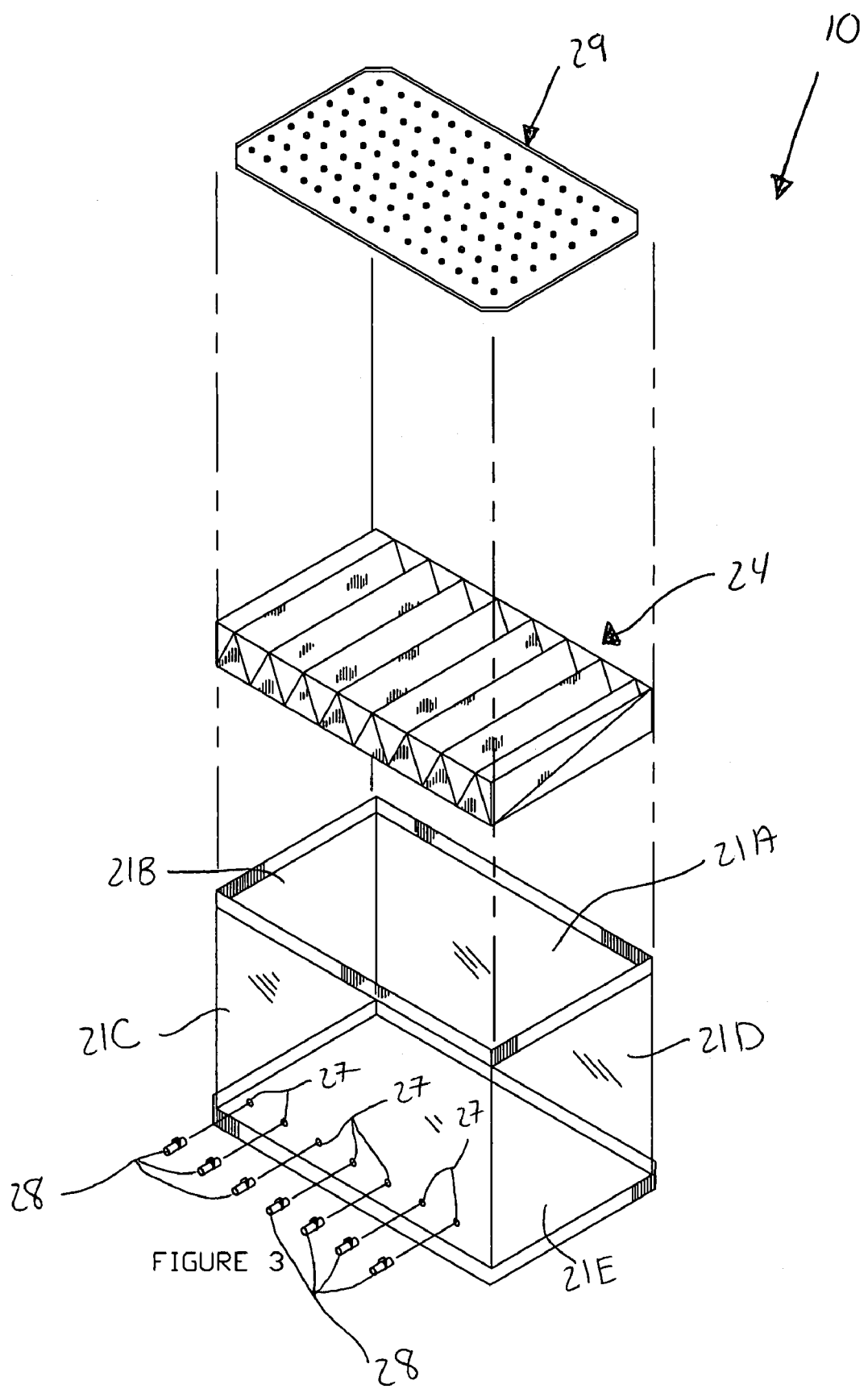
FIG. 3 is an exploded view of the self-cleaning aquarium shown in FIG. 1.

The apparatus of this invention is referred to generally in FIGS. 1-3 by the reference numeral 10 and is intended to protect a self-cleaning aquarium. It should be understood that the apparatus 10 may be used to filter many different types of aquariums and should not be limited in filter any specific aquarium described hereinbelow.

Referring collectively to FIGS. 1, 2 and 3, the apparatus 10 includes a container 20 having a plurality of monolithically formed walls 21A, 21B, 21C and 21D defining a cavity 23 therebetween which is essential for receiving and housing the water. One of the walls 21E has a plurality of apertures 27 formed therein that span along a major longitudinal length thereof. It is critical for the apertures to equidistantly span along the bottom of wall 21A so that the bacteria and debris can be effectively discharged from the cavity 23.

Referring to FIGS. 1, 2 and 3, the apparatus 10 further includes a corrugated base member 24 that is removably housed within the container 20 and seated directly, without the use of intervening elements, on a bottom one of the walls 21E. Such a base member 24 has a plurality of juxtaposed crests 25 and troughs 26 horizontally offset along a longitudinal length of the bottom wall 21E. The troughs 26 are advantageously abutted against the one wall 21E and linearly aligned with the apertures 27 respectively. Such crests 25 and troughs 26 are equidistantly spaced apart such that the valves 28 are centrally aligned with the troughs 26. Such central alignment of the valves with the troughs ensures that the accumulated debris and bacteria will flow easily from the trough and aperture and directly through the valve during aquarium maintenance.

Referring to FIGS. 1, 2 and 3, the base member 24 is intercalated between the filter screen 29 and the bottom wall 22 of the container 20 respectively. The base member 24 conveniently includes a plurality of coextensively shaped walls diagonally 29 spanning from the bottom wall 21E of the container 20 to the filter screen 29. Relating to the base member 24, each of the walls 21A, 21B, 21C, 21D and 21E effectively have planar faces 30A, 30B wherein a first group of the walls 30A are disposed parallel to each other while a second group of the walls 30B are disposed parallel to each other. Selected ones of the first 30A and second 30B group of walls are advantageously registered orthogonal to adjacent ones of the second 30B and first 30A group of walls respectively. Such an arrangement of the walls 30A and 30B is critical for channeling the bacteria and debris downwardly to a common axis so that cavity 23 is effectively filtered during cleaning operations. Such arrangement of the walls moves the bacteria and debris directly into the trough and thereby accumulates near the aperture and can be easily eliminated by use of the valve during cleaning and maintenance of the aquarium.

Referring again to FIGS. 1 and 3, the apparatus further includes a filter screen 29 removably positioned directly, without the use of intervening elements, on the base member 24. Such a filter screen 29 is conveniently situated above the apertures 27. The filter screen 29 is provided with a plurality of uniformly disposed holes 33 formed therein. Selected rows of the holes 33 are aligned between corresponding pairs of the crests 25 which are critical for directing the undesirable debris and bacteria towards corresponding ones of the troughs 26 respectively. The filter screen is removably positioned on the base member to allow a user to gain access to the base member and apertures in order to remove clogs in such areas when necessary.

Referring to FIGS. 1, 2 and 3, the apparatus further includes a plurality of valves 28 operably coupled to the apertures 27 and is in fluid communication with the cavity 23 which is crucial for discharging the undesirable debris and bacteria outwardly from the cavity 23. Such valves 28 are independently adapted between open and closed positions and allow a user to easily dispense of accumulated debris and bacteria from the apertures.

The valves 28 provide the unexpected benefit of automatically discharging undesirable debris and bacteria from the apertures. This allows the user to simply turn the valves in order to empty the apertures into an appropriate disposal container, and thereby completes the cleaning and maintenance of the aquarium. Such benefits overcome the prior art shortcomings.

In use, the self-cleaning aquarium is simple and straightforward to use. A method for discharging undesirable debris and bacteria from an aquarium while aquatic animals are housed therein includes the steps of providing a container that has a plurality of monolithically formed walls that define a cavity therebetween for the receiving and housing of water. The steps further include forming a plurality of apertures in one of the walls and the apertures span along a major longitudinal length of the one wall.

In use, the steps further include removably housing a corrugated base member 24 within the container 20 by directly, without the use of intervening elements, seating the base member 24 on a bottom one of the walls 21E. The base member 24 has a plurality of juxtaposed crests 25 and troughs 26 horizontally offset along a longitudinal length of the bottom wall 21E. The steps further include abutting the troughs 26 against the one wall 21E by linearly aligning the troughs 26 with the apertures 27 respectively and removably positioning a filter screen 29 directly, without the use of intervening elements, on the base member 24 by situating the filter screen 29 above the apertures 27. In use, the steps further include operably coupling a plurality of valves 28 to the apertures 27 such that the valves are in fluid communication with the cavity 23 for discharging the undesirable debris and bacteria outwardly from the cavity 23.

While the invention has been described with respect to a certain specific embodiment, it will be appreciated that many modifications and changes may be made by those skilled in the art without departing from the spirit of the invention. It is intended, therefore, by the appended claims to cover all such modifications and changes as fall within the true spirit and scope of the invention.

In particular, with respect to the above description, it is to be realized that the optimum dimensional relationships for the parts of the present invention may include variations in size, materials, shape, form, function and manner of operation. The assembly and use of the present invention are deemed readily apparent and obvious to one skilled in the art.

What is claimed as new and what is desired to secure by Letters Patent of the United States is:

1. A self-cleaning aquarium for automatically removing undesirable debris and bacteria from water housed within the aquarium while aquatic animals remain within the aquarium, said self-cleaning aquarium comprising:
    a container having a plurality of monolithically formed walls defining a cavity therebetween for receiving and housing the water, one of said walls having a plurality of apertures formed therein and spanning along a major longitudinal length thereof;
        a corrugated base member removably housed within said container and seated directly on a bottom one of said walls, said base member having a plurality of juxtaposed crests and troughs horizontally offset along a longitudinal length of said bottom wall, said troughs being abutted against said one wall and linearly aligned with said apertures respectively;
        a filter screen removably positioned directly on said base member, said filter screen being situated above said apertures; and
        a plurality of valves operably coupled to said apertures and being in fluid communication with said cavity for discharging the undesirable debris and bacteria outwardly from said cavity.

2. The self-cleaning aquarium of claim 1, wherein each of said valves are independently adapted between open and closed positions.

3. The self-cleaning aquarium of claim 2, wherein each of said crests and troughs are equidistantly spaced apart such that said valves are centrally aligned with said troughs.

4. The self-cleaning aquarium of claim 3, wherein said filter screen is provided with a plurality of uniformly disposed holes formed therein, selected rows of said holes being aligned between corresponding pairs of said crests for directing the undesirable debris and bacteria towards corresponding ones of said troughs respectively.

5. The self-cleaning aquarium of claim 4 wherein said base member is intercalated between said filter screen and said bottom wall of said container respectively.

6. The self-cleaning aquarium of claim 5, wherein said base member comprises: a plurality of coextensively shaped walls diagonally spanning from said bottom wall of said container to said filter screen, each of said walls having planar faces wherein a first group of said walls are disposed parallel to each other while a second group of said walls are disposed parallel to each other, selected ones of said first and second group of walls are registered orthogonal to adjacent ones of said second and first group of walls respectively.

7. A self-cleaning aquarium for automatically removing undesirable debris and bacteria from water housed within the aquarium while aquatic animals remain within the aquarium, said self-cleaning aquarium comprising:
    a container having a plurality of monolithically formed walls defining a cavity therebetween for receiving and housing the water, one of said walls having a plurality of apertures formed therein and spanning along a major longitudinal length thereof;
        a corrugated base member removably housed within said container and seated directly on a bottom one of said walls, said base member having a plurality of juxtaposed crests and troughs horizontally offset along a longitudinal length of said bottom wall, said troughs being abutted against said one wall and linearly aligned with said apertures respectively;
        a filter screen removably positioned directly on said base member, said filter screen being situated above said apertures; and
        a plurality of valves operably coupled to said apertures and being in fluid communication with said cavity for discharging the undesirable debris and bacteria outwardly from said cavity;
        wherein said crests and said troughs extend along linear paths defined orthogonally to a longitudinal length of said container and across an entire width thereof.

8. The self-cleaning aquarium of claim 7, wherein each of said valves are independently adapted between open and closed positions.

9. The self-cleaning aquarium of claim 8, wherein each of said crests and troughs are equidistantly spaced apart such that said valves are centrally aligned with said troughs.

10. The self-cleaning aquarium of claim 9, wherein said filter screen is provided with a plurality of uniformly disposed holes formed therein, selected rows of said holes being aligned between corresponding pairs of said crests for directing the undesirable debris and bacteria towards corresponding ones of said troughs respectively.

11. The self-cleaning aquarium of claim 10, wherein said base member is intercalated between said filter screen and said bottom wall of said container respectively.

12. The self-cleaning aquarium of claim 11, wherein said base member comprises: a plurality of coextensively shaped walls diagonally spanning from said bottom wall of said container to said filter screen, each of said walls having planar faces wherein a first group of said walls are disposed parallel to each other while a second group of said walls are disposed parallel to each other, selected ones of said first and second group of walls are registered orthogonal to adjacent ones of said second and first group of walls respectively.

13. A method for discharging undesirable debris and bacteria from an aquarium while aquatic animals are housed therein, said method comprising the steps of:
   a. providing a container having a plurality of monolithically formed walls defining a cavity therebetween for receiving and housing the water;
   b. forming a plurality of apertures in one of said walls, said apertures spanning along a major longitudinal length of said one wall;
   c. removably housing a corrugated base member within said container by directly seating said base member on a bottom one of said walls, said base member having a plurality of juxtaposed crests and troughs horizontally offset along a longitudinal length of said bottom wall;
   d. abutting said troughs against said one wall by linearly aligning said troughs with said apertures respectively;
   e. removably positioning a filter screen directly on said base member by situating said filter screen above said apertures; and
   f. operably coupling a plurality of valves to said apertures such that said valves are in fluid communication with said cavity for discharging the undesirable debris and bacteria outwardly from said cavity;
   wherein said crests and said troughs extend along linear paths defined orthogonally to a longitudinal length of said container and across an entire width thereof.

14. The method of claim 13, further comprising the steps of:
   a. independently adapting each of said valves between open and closed positions.

15. The method of claim 13, wherein each of said crests and troughs are equidistantly spaced apart such that said valves are centrally aligned with said troughs.

16. The method of claim 13, wherein said filter screen is provided with a plurality of uniformly disposed holes formed therein, selected rows of said holes being aligned between corresponding pairs of said crests for directing the undesirable debris and bacteria towards corresponding ones of said troughs respectively.

17. The method of claim 13, wherein said base member is intercalated between said filter screen and said bottom wall of said container respectively.

18. The method of claim 13, wherein said base member comprises: a plurality of coextensively shaped walls diagonally spanning from said bottom wall of said container to said filter screen, each of said walls having planar faces wherein a first group of said walls are disposed parallel to each other while a second group of said walls are disposed parallel to each other, selected ones of said first and second group of walls are registered orthogonal to adjacent ones of said second and first group of walls respectively.

* * * * *